Jan. 23, 1968   M. THOME   3,365,224
CORNER OR BUTT JOINT
Filed Jan. 7, 1966   4 Sheets-Sheet 1

Inventor:
Manfred Thome

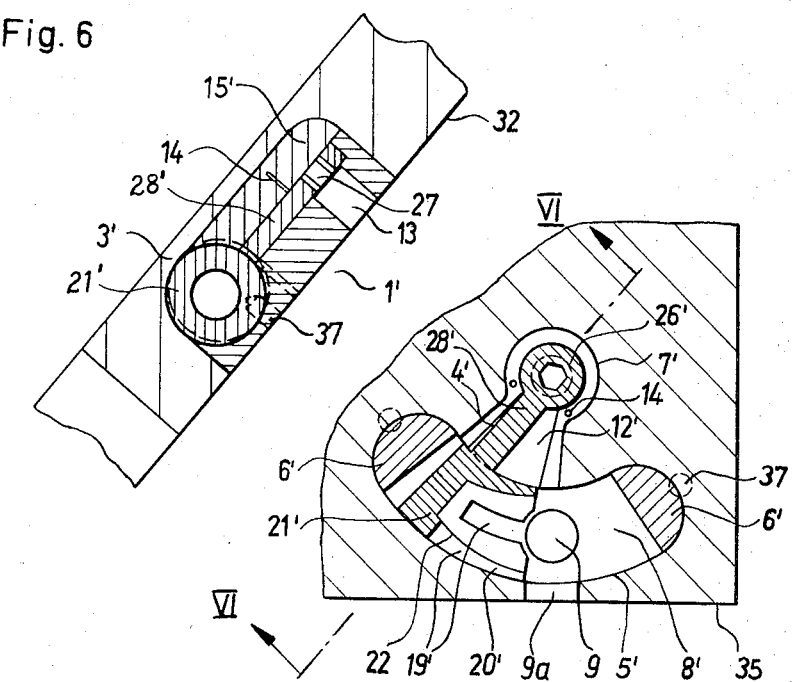

Fig. 9
Fig. 8
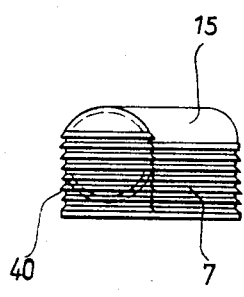
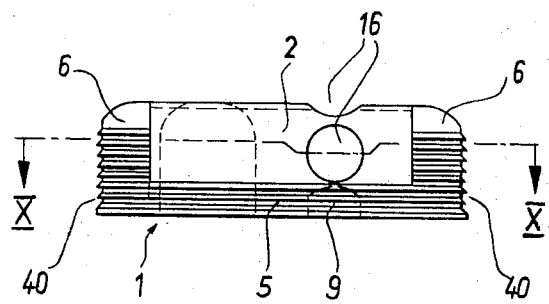
Fig. 11
Fig. 10
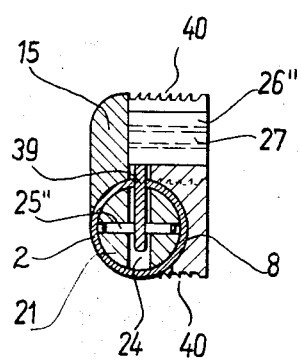
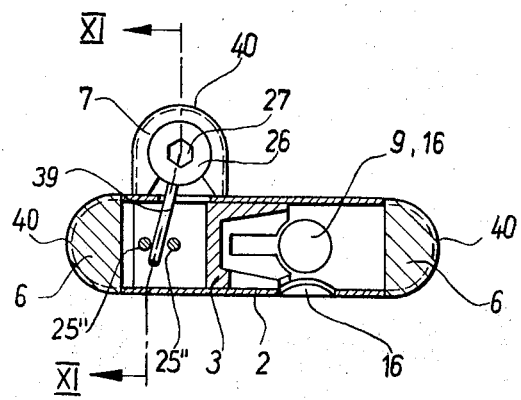
Inventor:
Manfred Thome United States Patent Office 3,365,224
Patented Jan. 23, 1968

3,365,224
CORNER OR BUTT JOINT
Manfred Thome, Karlsruhe, Germany, assignor to Gebruder Thome, Kommanditgesellschaft, Forchheim, near Karlsruhe, Germany
Filed Jan. 7, 1966, Ser. No. 519,379
Claims priority, application Germany, Jan. 7, 1965, T 27,767
21 Claims. (Cl. 287—20.924)

ABSTRACT OF THE DISCLOSURE

A corner or butt joint primarily for securing flat structural parts to each other, such as the top, bottom or side walls or partitions of furniture items, boxes or other prefabricated commodities which are adapted to be easily assembled and disassembled. A lock bushing is mounted for reciprocation in one structural part and has a plurality of axially aligned wedge slots for receiving the shanks of headed fasteners in another structural part so that axial reciprocation of the bushing will draw the parts together. The bushing is contained within a sleeve for resisting radial stresses and the headed fastener has a collar portion for centering in a correspondingly sized bore in the structural part containing the bushing. The bushing is contained within a housing along with a tool operated actuating lever.

---

The present invention is an improvement of the device as described and claimed in my copending applications, Ser. Nos. 247,627, filed on Dec. 27, 1962 (now U.S. Patent No. 3,229,334) and 349,559, filed Mar. 5, 1964 (now U.S. Patent No. 3,229,335).

One considerable difficulty in the production and assembly of furniture and other commodities which are made of prefabricated parts has in the past consisted in the lack of suitable means for attaining a corner or butt joint which permits adjacent boards to be easily and securely connected to each other in a manner so that the joint has a solidity and tightness equal to a glued joint and in such a way that the mechanical parts of the joint are not visible from the outside or at least do not effect the appearance of the piece of furniture.

The devices described in my above-mentioned copending applications solve to a great extent the problems inherent in the production of corner or butt joints in prefabricated commodities in providing the required rigidity of construction and ease of assembly and disassembly; however, each of these devices, which perform in a remarkably efficient manner, suffers the drawback that due to their construction and manner of engagement with the structural parts to be secured, either the device itself or the aperture into which it is inserted is visible on the outside surface of the furniture. Covers or caps for closing the aptreures and hiding the securing devices have been proposed, however, such articles increase the cost of the device unnecessarily and are prone to be misplaced or lost due to their being provided as an element separate from the securing device itself.

It is therefore a principle object of the instant invention to provide a very simple device for producing corner and butt joints between flat boardlike and platelike structural components, such as the walls or partitions of furniture items, boxes, or any other similar commodities, which device is of very simple and inexpensive construction and may be very easily mounted on the components to produce a very solid joint between them and may, if desired, again be just as easily removed to disassemble the components while providing the device of such construction as to make possible in the completed assembly substantially complete elimination of the device from view on the outer surface of the joint.

The present invention is based upon the recognition that the devices such as provided heretofore can be substantially hidden from view without sacrificing structural strength or rigidity in the joint or economy of manufacture without use of separate covers or shields only if the device can be designed to be inserted into the structural parts in such a way as to be covered by one or more of the associated structural parts of the joint. In other words, instead of inserting the securing device into the visible end face of one of the structural members as done heretofore, the securing device can be hidden if it is inserted into a surface of one structural member which is to be subsequently covered by another structural member in forming the joint.

According to the present invention, a securing device may be provided in one of the components forming the corner or butt joint or in a separate connecting bar, by providing one or more milled slots or recesses in the wide side or flank of the connecting structural part adjacent the sides thereof along a common edge, in providing transverse bores in the edge and side opposite the milled slots to which other components are to be secured and making these transverse bores of a length so as to terminate into the milled slot, and by further providing a housing to be inserted into the milled slot or recess for guiding a bushing having a number of slots of inclined thickness equal to the number of structural members to be joined and being reciprocal between an inoperative position and a position engaging in a wedge-locking manner a plurality of anchoring devices secured to the other structural members of the joint and inserted into the transverse bores and through corresponding holes in said housing into engagement with the slots in said bushing. In accordance with the invention, means are provided adjacent the housing for externally actuating the slidable bushing between its inoperative and operative positions and positioned such that the housing itself can be completely covered by an associated structural member during assembly without obstructing the means for actuating the bushing to finally lock or subsequently unlock to securing device forming the joint.

The assembly of a piece of prefabricated furniture equipped with the corner or butt joint according to the present invention is extremely simple. In contrast to all of the heretofore known constructions, all the mechanical parts required for a secure connection are already premounted during the manufacture thereof. For obtaining a corner connection, only two structural parts are needed, namely, a securing device and an ordinary structural part; the small individual parts, such as loose cleats, bushings, closing covers, etc., are superfluous and can thus be completely eliminated. In addition, the corner and, respectively, joint connection as proposed by the present invention allows for the mounting of furniture directly to the wall against which it is to be placed since the bushing which is guided in the housing may be actuated from the side by means of the actuating tool.

For making or obtaining a corner or joint connection according to the present invention, two securing devices are generally introduced into corresponding milled slots or recesses of the structural connecting part. If two or more structural parts having the same width are intended to be connected, the milled slots or recesses are provided near the front and rear edges of the connecting structural part; however, if it is intended to connect structural parts having different width to constitute arrangements of furniture having different depths, the milled slot or recess at the front of the structural connecting part is simply displaced further toward the rear in conformity with the smaller depth of the other structural parts. With the aid and by means of the corner or joint connection according to the present invention, it is thus possible to erect an interlocking furniture assembly which is composed of structural parts having a variable depth.

According to a preferred embodiment of the present invention, the securing device for the joint includes a housing consisting of a base or bottom plate having an internal configuration corresponding to the cross section of the slidable bushing and forming a groove for guiding the bushing accurately during reciprocating movement. The end faces of the bottom plate are adjoined by two crown pieces extending vertically thereto and one of the sidewalls of the bottom plate is provided with a lateral extension for supporting means for guiding the bushing externally of the securing device by way of a tool inserted in a bore in the lateral extension. The bushing is slidable within the groove partially surrounding it at the inside of the bottom plate of the housing and the two crown pieces at the end faces of the base or bottom plate serve for limiting the displacement of the bushing in both directions and for fastening or anchoring the housing with the bushing in the milled slot or recess of the structural connecting part. The underside of the bottom plate which is visible from the outside after the introduction of the housing into the milled slot or recess is then covered by the adjacent structural part so that only the part of the underside of the lateral extension with the bore for the tool remains uncovered.

The milled slot or recess is advantageously obtained in the structural part by means of a milling cutter having a cylindrical shaft and hemispherical head, and the diameter of the hemisphere corresponds to the diameter of the bushing. A further groove is thereby formed in the bottom of the milled slot or recess which serves, together with the groove in the base or bottom plate, for guiding the bushing.

The attachment of the housing in the milled slot or recess of the structural connecting part may be made in a conventional manner with the aid of screws, for example, by means of threaded grooves disposed at the outside of the crown pieces. A lever which engages laterally at the bottom of the bushing and is provided, for example, with a hexagonal bore for the action of a tool serves advantageously for the displacement of the bushing.

The bottom of the bushing which is provided cup-shaped in a manner known per se is provided at the other end therefrom with a deep transverse slot which is traversed by a cylindrical bolt or pin which is engaged by a lever, being pivotably positioned with a circular swivel head in a milled slot or recess of the lateral extension of the bottom member, and having a slot in the end thereof which accommodates the bolt or pin secured to the bushing in such a way that its acts on the bolt on both sides thereof. This particular construction of the bushing and of the lever moving it has the advantage that the force which effects or results in the displacement of the bushing and which is exerted by means of the tool acts in the center of the bushing. This eliminates any possible canting and clamping of the bushing.

According to a further advantageous embodiment of the present invention and for the purpose of achieving an improved guide for the bushing within the housing, a tubular sleeve, made preferably from steel tubing having a small wall thickness, is provided for receiving the bushing, and is arranged between the crown pieces and rests upon the groove, which tubular sleeve includes three holes disposed at an angle of 90 degrees in the transverse plane extending through the central axis of a corresponding aperture in the bottom member and having the same diameter as the aperture and further includes as well a rectangular recess or clearance for the lever. The displacement of the bushing would be conceivable with the use of this sleeve also with the aid and by means of a lever which comprises a small toothed segment instead of a slot at the end thereof. The teeth of this toothed segment would mesh in several counter teeth which are milled into the outer jacket of the bushing in proximity to the bottom thereof.

An advantageous characteristic of the invention resides in the fact that the housing and the sleeve, respectively, may comprise at the sides of each of the crown pieces facing each other a cam whose elevation above the bottom of the base or bottom plate is only slightly greater than the wall thickness of the sleeve, and marginal recesses or clearances each disposed at the ends of the sleeve and corresponding to the cams are provided to allow the sleeves to pass the cams and engage the base or bottom plate. By means of the cams and the marginal clearances, the sleeve may be locked within the housing so that it is retained in the position thereof when the housing is mounted into the structural connecting part.

A further characteristic of the present invention is provided in the form of a cover detachably closing the lateral extension of the base or bottom plate on one side thereof, and this cover is secured in position by means of pins inserted into the lateral walls of the abutment and whose projecting ends engage in the cover. The cover retains the lever in proper position under all conditions.

According to another embodiment of the corner or joint connection proposed by the present invention, the slidable bushing may have a curved configuration corresponding to a circular ring sector whose center of curvature is positioned at the pivot axis of the lever. The bushing is slidably positioned, in this embodiment, in a circular ring-shaped curved groove delimited by the two crown pieces at both ends of a corresponding circular ring-shaped base or bottom plate. The end of the arm of the lever being pivotable about the center of curvature in the abutment in this embodiment may be rigidly connected with the bottom of the bushing. In the case of this embodiment, there is no need for a sleeve to guide the bushing. The housing and bushing are provided as molded parts which may suitably be manufactured according to one of the known pressure molding and respectively, injection molding processes.

According to a further feature of the present invention, the wood screws forming the anchoring devices for the associated structural parts of the joint are provided closely underneath the head thereof with a fitted collar having a thickness corresponding to the width of the openings in the bottom plate tubular sleeve. This fitted collar facilitates the attachment of the structural parts to the structural connecting part as well as the locking of the heads of the wood screws through the bushing and assures the predetermined position of the structural parts with respect to each other prior to actual locking by means of the locking tool.

The housing consists advantageously of plastic material whose color corresponds to the staining of the wood of the structural connecting part, thereby further hiding the device and the manufacture of the housing from plastic material by means of a pressure or injection molding tool is a cost-reducing factor in view of the large number of fittings required for assembly of furniture.

Two symmetrical securing devices of mirror image are expediently accommodated in the wide side or flank of the structural connecting part in such a manner that the openings thereof will be positioned adjacent the two long sides of the structural connecting part. This provision allows for optimum conditions with respect to the rigidity against distortion or warping of the assembly furniture which is joined or mounted together by means of the corner or joint connection according to the present invention in view of the fact that the connecting points being defined therein by the position of the openings in the structural connecting parts and, respectively, of the wood screws in the abutting surfaces of the adjoining structural parts are spaced or disposed apart with respect to each other, as far as is possible on the basis of the depth of the structural parts.

In accordance with yet another embodiment of the securing device according to the present invention, the lever engaging with the bushing for reiprocation thereof consists of a swivel head provided as a roller, with a hexagonal opening therein and a short pin-like bar or rod serving as a lever arm. Through the transverse slot in the bottom of the bushing extend two cylindrical bolts or pins disposed at a short distance with respect to each other in a longitudinal plane disposed at right angle to the transverse slot. Between these bolts engages the short rod or bar forming the lever arm which adjusts the position of the bushing. The provision of the swivel head as a roller, and of the arm as pin-like rod made from steel assures in a simple manner the transfer of great forces to the bushing by means of the hexagon spanner without involving any danger of a breaking-out of the wall of the abutment, or a distortion of the arm.

According to a further advantageous provision of the housing of the securing device, rib portions having a sawtooth-shaped cross section and extending circularly in planes parallel to the base or bottom plane are disposed at the outer surfaces of the crown pieces as well as at the lateral surfaces of the bottom plate and the lateral extension thereof and serve for fastening or mounting the housing within the structural connecting part. After the securing member has been pressed into the milled slots or recess provided for this purpose at the wide sides or flanks of the structural connecting part, these web portions are caulked against the walls of this milled slot or recess, thus resulting in a firm support of the fitting within the structural connecting part. The effect of the web portions may, if necessary, also be enhanced by the addition of a suitable adhesive agent.

Further details, features and advantages of the present invention will be apparent from the following description of various embodiments thereof when taken in conjunction with the attached drawings, wherein:

FIGURE 5 is a horizontal cross-sectional view of a second embodiment relative to the fitting proposed in connection with the corner and butt joint respectively, according to the present invention, the fitting being installed therein in a structural connecting part;

FIGURE 6 is a cross-sectional view of the same fitting, taken along line VI—VI of FIGURE 5;

FIGURE 8 is a front elevational view of still another embodiment of a securing device as proposed for making a corner or butt joint according to the present invention;

FIGURE 9 is a side elevational view of the device of FIGURE 8;

FIGURE 10 is a horizontal cross-sectional view taken along line X—X of FIGURE 8; and FIGURE 11 is avertical cross-sectional view taken along line XI—XI of FIGURE 10.

Figure 2:
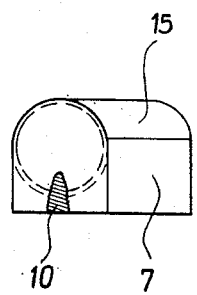
FIGURE 2 is a side elevational view of the fitting shown in FIGURE 1.
Figure 1:
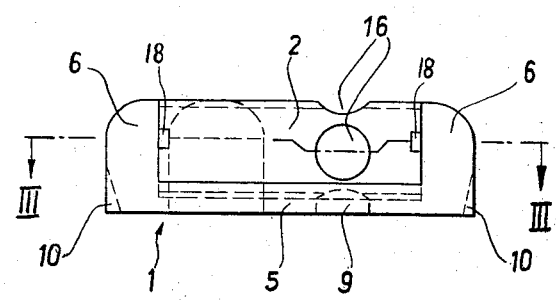
FIGURE 1 is a front elevational view of a securing device which serves for attaining a corner or butt joint as proposed by the present invention.
Figure 4:
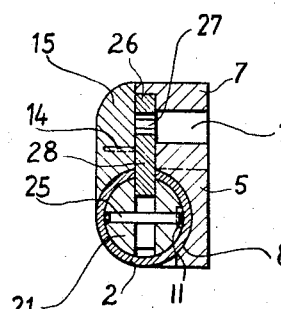
FIGURE 4 is a vertical cross-sectional view of the same fitting, taken along line IV—IV of FIGURE 3.
Figure 3:
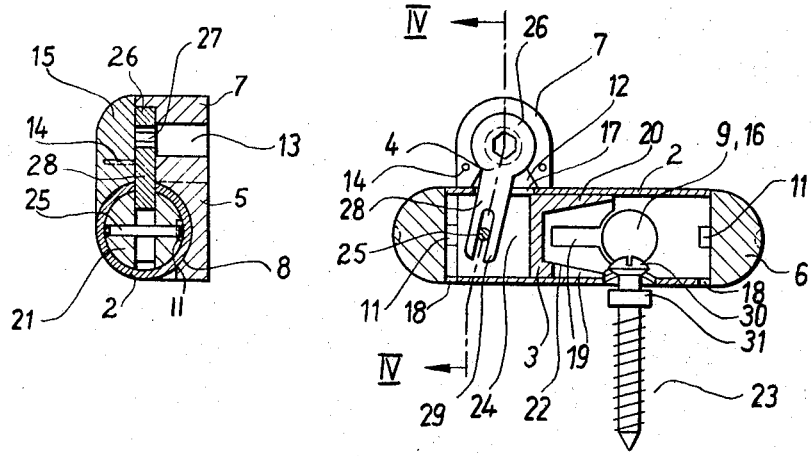
FIGURE 3 is a horizontal cross-sectional view of the same fitting, taken along line III—III of FIGURE 1.

Looking now to the drawings wherein like reference numerals have been used throughout the several views to indicate corresponding elements, and particularly to FIGURES 1 to 4, one embodiment of the securing device which makes possible a corner or butt joint of transversely arranged structural parts in accordance with the present invention consists basically of a housing 1, a sleeve 2 in which a bushing 3 is longitudinally slidably disposed, as well as a lever 4 for shifting the bushing 3.

The housing 1 comprises an elongated base or bottom plate 5 and two crown pieces 6 attached at respective ends thereof and positioned at right angle to the base or bottom plate 5. An extension 7 for supporting the lever 4 is constituted as an integral part at one of the bottom plates 5 along one side thereof and near one of the crown pieces 6. The inside surface of the bottom plate 5 is provided as a groove 8 (FIGURE 4) within which the sleeve 2 is positioned and the cross sectional shape thereof corresponds to the shape of the cylindrical jacket of the sleeve 2 so as to provide complete support for the sleeve. The base or bottom plate is additionally provided with a circular opening 9, which, as will be described in greater detail hereinafter, serves to receive suitable anchoring members on associated structural parts.

The two crown pieces 6 have a hemispherical cross section (see FIGURE 3) and are each provided in the shape of a quarter sphere whose diameter corresponds to the diameter of the cylindrical outer jacket of the sleeve 2. Along the zenithal line of both crown pieces 6, threaded grooves 10, each being open toward one side, are cut into the crown pieces in a beveled manner and accommodate securing screws, with the aid of which the housing is secured wtihin the body of the structural part. Provided at the inside of each of the crown pieces 6 near the bottom of the groove 8 but spaced therefrom by a distance slightly larger than the wall thickness of the sleeve 2 is a cam 11 which clamps the sleeve against the bottom plate 5 and thereby retains or secures the sleeve 2 in the position. The extension 7 has a key-hole like aperture 12 for receiving the lever 4 including a bore 13 for accommodating the tool or device needed to actuate the lever 4. Inserted into and protruding from the lateral walls of the extension 7 are two pins 14 which serve for supporting a cover or lid 15, which, in turn, serves to close off or enclose the inner face of the extension 7.

The sleeve 2 is in the form of a short straight steel tube having a small wall thickness. Near one end thereof, the sleeve 2 is provided with three holes 16, one of which is provided in alignment with the hole 9 in the bottom plate 5, and the other two of which are disposed at 90 degrees and 180 degrees thereto, respectively. The diameter of these holes is equal to the diameter of the opening 9 in the bottom plate 5. An elongated rectangular recess or clearance 17 is cut into the side of the sleeve 2 diametrically opposite the central one of the three holes 16 and offset therefrom in the axial direction of the sleeve. Accommodated in each of the two ends of the sleeve 2 and on the side of the jacket thereof diametrically opposite the recess or clearance 17 is a marginal clearance 18 corresponding in size and shape to the cams 11, which permit the sleeve 2 to pass the cams 11 and thereby contact the groove 8 during insertion of the sleeve into the housing 1.

The bushing 3 being displaceable or slidable within the sleeve 2 has a cup-shaped configuration at one end thereof which comprises a wall 20 subdivided by means of three open elongated slots 19 whose inner surface constitutes a wedge-shaped tapering surface 22 which angles outwardly away from the bottom 21 of the bushing 3. The inside width of the elongated slots 19 is dimensioned to be only slightly greater than the shaft diameter of the anchoring members or wood screws 23 (FIGURE 3) secured to the associated structural members. A deep transverse slot 24 is milled into the bottom 21 of the bushing 3 opposite the cup-shaped end in the longitudinal plane of one of the two elongated slots 19 and this transverse slot 24 is vertically intersected by a bolt or pin 25 approximately at half the depth thereof.

The lever 4, which serves to displace or shift the bushing 3, includes a circular swivel head 26 and a lever arm 28 and is pivotably positioned with the circular swivel head 26 in the aperture 12 of the extension 7. Arranged in the center of the swivel head 26 is a hexagonal hole 27 for the engagement of the tool which actuates the lever. A slot 29 is provided in the end of the pivot arm 28, which extends through the transverse slot 24 of the bushing 3 with the slot 29 of the lever arm engaging the bolt or pin 25 in the bushing.

The wood screw 23 (FIGURE 3) which is anchored in an associated structural part is provided with a suitable thread and includes a fitted collar 31 positioned closely below the head 30 thereof, which has a diameter either identical with or slightly smaller than the diameter of the fitted collar 31. The diameter of the fitted collar 31 corresponds to the diameter of the opening 9 in the bottom plate 5 and, respectively, of the apertures 16 in the sleeve 2; and the thickness thereof is approximately equal to the thickness of the bottom plate 5.

The corner or butt joint of the instant invention, as illustrated in FIGURES 1–4 is assembled in the following manner:

The bushing 3 is inserted into the sleeve 2 in such a manner that one side of the transverse slot 24 being disposed in the bottom 21 of the bushing coincides with the recess 17 in the sleeve 2. Through the recess 17 the lever 4 is slid or inserted with the arm 28 thereof entering into the transverse slot 24 so that the slot 29 therein engages with the bolt or pin 25. Thereafter, the sleeve 2 together with the bushing 3 positioned therein and the lever 4 is inserted between the crown pieces 6 of the housing 1 into the groove 8. This can be accomplished, as indicated above, only if during the insertion, the two marginal recesses or clearance 18 in the ends of the sleeve 2 are in alignment with the cams 11 at the inner sides of the crown pieces 6. The sleeve 2 upon passing the cams 11 to contact the groove 8 is subsequently turned through an angle or approximately 90 degrees, at which time the ends of the sleeve 2 pass between the cams 11 and the groove surface 8 of the bottom plate 5 thus effecting a locking or wedging of the sleeve 2 in position. Toward the end of this rotary movement, the swivel head 26 of the lever 4 will come to be positioned in the depression 12 of the extension of bottom member 5. Lastly, the cover or lid 15 is mounted upon the abutment 7 to prevent the lever 4 from falling out of the depression 12. The securing device is then ready to be inserted into a structural member for use in effecting a corner or butt joint in association with other structural members.

A different embodiment of the securing device is illustrated in FIGURES 5 and 6. The housing 1' being constituted of two crown pieces 6' and an extension 7' of a base or bottom plate 5' includes a curved groove 8', and slidably arranged therein is the bushing 3', whose wall 20' is subdivided by means of three open longitudinal slots 19', the configuration of this bushing corresponding to a sector of a circular ring. The lever 4' serving for the displacement of the bushing 3' includes a swivel head 26' pivotably positioned in a depression 12' of the extension 7', which swivel head is provided with an arm 28' rigidly connected with the bottom 2' of the bushings 3'. A cover or lid 15' formed in conformity with the outline or cross section of the extension 7' closes off the extension 7' above the lever 4', thus preventing accidental falling out of the bushing 3'.

Figure 7:
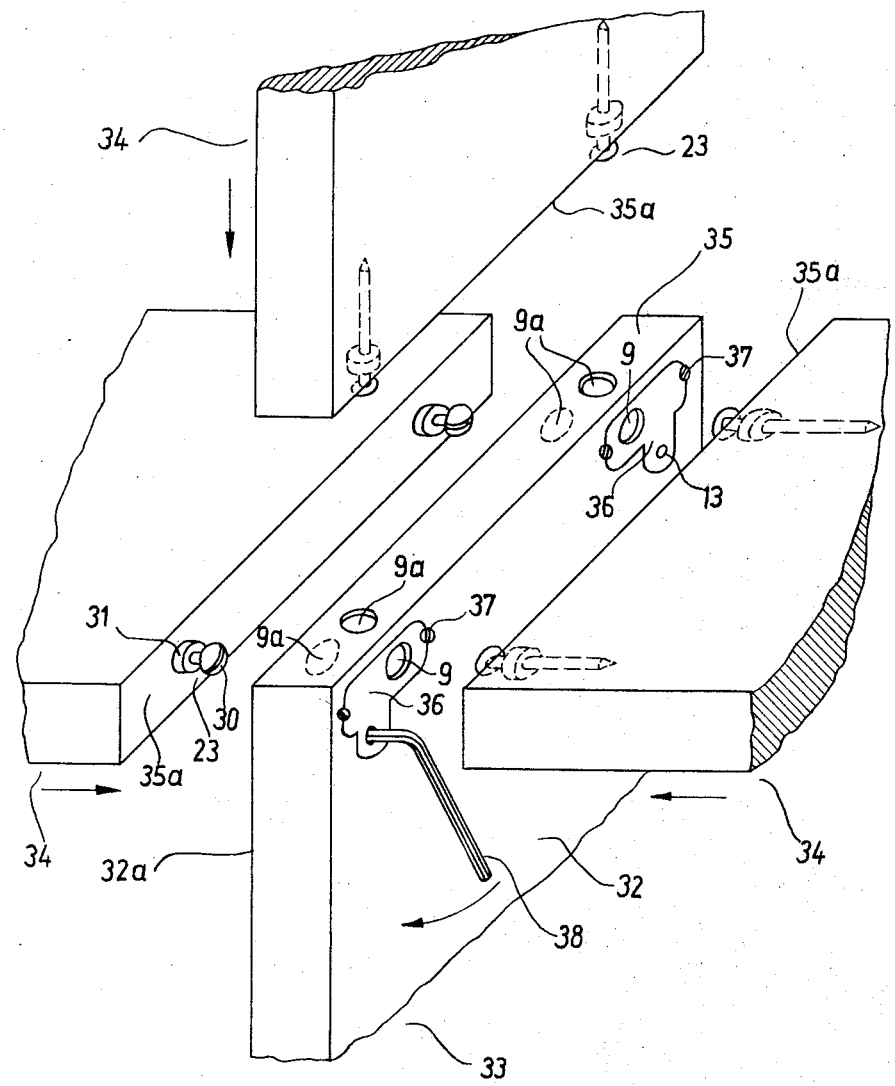
FIGURE 7 is an exploded perspective view of a joint connection as proposed by the present invention of four structural parts.

The manner in which the securing devices described above are utilized to form a corner or butt joint of four flat structural parts is illustrated in FIGURE 7 using the securing device described hereinabove and shown in FIGURES 1 through 4, as an example. Inserted into a suitable aperture cut into the side 32 of a structural connecting part 33, whose thickness and depth correspond to the adjoining structural parts 34, and near the upwardly pointing abutting surface or end 35 thereof are two securing devices 36 arranged in mirror-like fashion and secured in each case by means of two set screws 37 which are threaded in along the threads 10 at the crown pieces 6 of the housing 1. The center of the opening 9 of the bottom plate 5 is positioned below the abutting surface or end 35 by half the thickness of the connecting structural part 33, so as to be in alignment with the approximate center of the end 35a of structural part 34. Openings 9a in alignment with the apertures 16 in the sleeve 2 and whose diameters correspond to those of the fitted collars 31 at the wood screws 23 are accommodated both in the broad side 32a positioned opposite the fittings 36 and also in the abutting surface or end 35 of the structural connecting part 33.

Threaded into the abutting surfaces or ends 35a of the structural parts 34 and mounted perpendicularly thereto in position to register with the opening 9 in the bottom plate 5 as well as to the openings 9a in the structural connecting part are the wood screws 23 provided with the fitted collar 31. The underside or undersurface of the fitted collar 31 terminates within the openings 9 and 9a flush with the abutting surface 35a and the heads 30 project from the abutting surfaces 35a to such an extent that after the butting of the structural parts 34 against the structural connecting part 33, the heads will extend through the openings 9 and 9a, respectively, and through the apertures 16 in the sleeve 2, projecting or protruding into the sleeve 2 to such an extent that, during the displacement of the bushing 3 by means of a suitably angularly bent hexagon spanner 38 the heads 30 are gripped from behind by the tapering surface 22 of the bushing 3. As a result of the wedge shape of the surface 22, the heads 30 are concentrically drawn in and secured in position in a force-locking manner by means of a wedging effect. The fixing of the structural elements 34 with respect to depth and proper position against the structural connecting part 33 during the butting is accomplished by means of the fitted collars 31 at the wood screws 23 which engage snugly in a guiding manner in the openings 9 and 9a in the appropriate structural connecting part.

In the joint connection according to FIGURE 7, the force-locking engagement of the structural parts 34 at the connecting structural part 33 is effected or accomplished by means of an "oppositely oriented" wedging effect since the two fittings 36 are so provided in the structural connecting part 33 that the bushings 3 thereof with the elongated slots 19 thereof are displaced or shifted against each other. This increases the locking effect of the arrangement.

After the joint connection has been established, the two fittings 36 are almost completely covered by the butting surface 35a of the associated structural parts 34 resting against the broad side thereof and are thus hidden from view. Only a portion remains visible and accessible of the bottom of the extension 7 including the bore 13 for the tool.

For purposes of releasing or disengaging the joint connection, the hexagon spanner 38 is introduced into the bore 13 of the fittings 36 and the bushings 3 are pushed back by means of a pivoting motion of the hexagon spanner. In the end position of the bushings 3, the heads 30 of the wood screws 23 are released or freed again from the operative engagement with the bushing and the structural parts 34 may be detached from the structural connecting part.

A further embodiment of the invention is illustrated in FIGURES 9, 10, 11 and 12. As is apparent from the figures, this securing device is very similar in construction to that illustrated in FIGURES 1 through 4; however, in this embodiment the lever 4 acting laterally at the bottom 21 of the bushing 3 as an element for displacing or shifting the bushing 3 consists therein of a swivel head 26'', provided as a roller, including a hexagonal hole 27, and a short rod 39 serving as a lever arm. The transverse slot 24 in the bottom 21 of the bushing 3 is here traversed by two cylindrical bolts 25'' between which acts or engages the short rod 39, to shift the bushing 3 to one position or another. For purposes of attaching or securing the housing 1 in the connecting structural part 33, the outer surfaces of the crown pieces 6 and of the extension 7 of the bottom plate 5 as well as the lateral surfaces of the bottom plate itself, are provided with rib portions extending in a circular manner and having a sawtooth-shaped cross section which engages in the walls of the structural member in a locking manner. The wedging slant of these ribs facilitates insertion of the locking device into the structural member but strongly opposes reverse movement.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A corner or butt joint for removably securing flat structural parts to each other while permitting the same to be easily assembled and disassembled, comprising:
   a plurality of structural parts,
   a plurality of shafts having enlarged heads tapered on the side thereof facing said shafts, said shafts being mounted in all but one of said structural parts with said heads projecting a predetermined uniform distance from one surface of said parts,
   connecting means for securing said structural parts by firmly engaging said shafts including at least one recess in a surface of said one structural part to be covered by an associated structural part, transverse bores extending into said recess from adjacent surfaces of said one structural part, and securing means having an aperture therein mounted tightly within said recess with said aperture exposed for locking said one structural part to the remaining structural parts,
   said structural parts in the assembled position being in tight contact with said connecting means with a structural part almost entirely covering said recess and having said projecting shafts inserted with the heads thereof into respective ones of said transverse bores including the aperture in said securing means, said securing means comprising:
      a housing having said aperture therein and a plurality of additional apertures, each of said apertures corresponding in size to said transverse bores and said additional apertures being in alignment therewith,
      a reciprocable bushing slideably mounted within said housing and having at one end thereof a tubular wall portion provided with a plurality of longitudinal slots extending to one edge thereof,
      each of said slots having a width smaller than the maximum diameter of the heads on said shafts and engaging said shafts beneath said heads in the assembled position, the opposing surfaces of said tubular wall portion being tapered to form wedge-shaped surfaces for said slots so that axial movement of said bushing in said housing provides for increased pressure on the tapered side of the head of each shaft engaged thereby, whereby said shaft is drawn toward the axis of said housing until all the structural parts are pressed tightly together,
      a lateral extension for said housing supporting actuating means for effecting axial displacement of said bushing within said housing externally thereof,
      a structural part in the assembled position entirely covering said housing leaving only said lateral extension exposed.

2. A corner or butt joint as defined in claim 1 wherein said housing consists of a bottom plate having a longitudinal arcuate groove therein including said aperture in said securing means and crown pieces at either end of said bottom plate to determine the extent of reciprocating movement of said bushing, said lateral extension for said housing including a bore for introducing a tool to operate said actuating means.

3. A corner or butt joint as defined in claim 2 further including,
   means for attaching said securing device within said recess in said one structural part including a threaded chamber in the outer side of each of said crown pieces of the housing extending from the underside of the bottom plate.

4. A corner or butt joint as defined in claim 2 wherein said actuating means includes a lever arm engaging with the end of said bushing opposite said slots and means in said lever arm for engagement by a tool suitable to pivot said lever arm to shift said bushing.

5. A corner or butt joint as defined in claim 3 wherein said bushing is provided with a deep transverse slot in the end thereof opposite said tubular wall portion and a pin traversing said transverse slot,
   said lever arm including a circularly shaped swivel head at one end thereof pivotally supported within the aperture in said lateral extension and a slot in the other end thereof engaging with said pin in said bushing.

6. A corner or butt joint as defined in claim 5 wherein said housing further includes a tubular sleeve disposed between said crown pieces and supported within the arcuate groove in said bottom plate, said bushing being slidably disposed within said tubular sleeve,
   said tubular sleeve including said additional apertures and a longitudinal slot for accommodating the interconnection of said actuating means and said bushing.

7. A corner or butt joint as defined in claim 6 wherein said crown pieces are each provided with a cam member protruding from the inner faces thereof and spaced above said arcuate groove by a distance only slightly greater than the thickness of said tubular sleeve,
   said tubular member being provided with a recess at each marginal edge corresponding in size to said cam members and positioned to permit passage of said tubular member past said cam members and into contact with said arcuate groove.

8. A corner or butt joint as defined in claim 1 wherein said lateral extension for said housing only partially encloses said actuating means and is provided with a cover and means to secure said cover thereon to completely enclose said actuating means.

9. A corner or butt joint as defined in claim 5 wherein said bushing and said housing are curved in the shape of a circular sector with the center thereof passing through the end of said lever arm in said lateral extension,
   said lever arm being rigidly secured to said bushing.

10. A corner or butt joint as defined in claim 5 wherein said shafts are provided each with a fitted collar positioned a predetermined distance below said tapered head and having a width corresponding to the depth of the aperture in said securing means.

11. A corner or butt joint as defined in claim 5 wherein said housing is made of an organic synthetic plastic material.

12. A corner or butt joint as defined in claim 5 wherein two recesses are provided in the wide flat side of said one structural part with securing means being disposed in mirror-image relationship in said two recesses.

13. A corner or butt joint as defined in claim 4 wherein said bushing is provided as a deep transverse slot in the end thereof opposite said tubular wall portion and a pair of pins traversing said transverse slot,
   said lever arm including a swivel head in the form of a roller at one end thereof pivotally supported within said lateral extension, said lever arm being interposed at its free end between said pins.

14. A corner or butt joint as defined in claim 5 wherein said housing and said lateral extension are provided with external rib portions having a saw-tooth cross section lying in planes parallel to said bottom plate, said rib portions extending circularly around said housing and serving to secure said securing means within said recess.

15. A securing device for a corner or butt joint comprising
a housing having a bottom plate provided with a longitudinal arcuate groove therein and crown pieces at either end thereof serving as end abutments, a tubular sleeve disposed between said crown pieces and supported within said arcuate groove, and a plurality of apertures disposed in said tubular sleeve and spaced at 90 degrees from each other in a common plane, said bottom plate having an aperture in alignment with one of the apertures of said tubular sleeve,
a reciprocable bushing slidably mounted within said tubular sleeve between said crown pieces and having at one end thereof a tubular wall portion provided with a plurality of longitudinal slots extending to one edge thereof, each of said slots having a width somewhat smaller than the apertures in said tubular sleeve, the opposing surfaces of said tubular wall portion being tapered to form wedge-shaped surfaces for said slots, and
a lateral extension for said housing supporting actuating means for effecting axial displacement of said bushing within said housing from outside thereof, said lateral extension including a transverse bore for introducing a tool to operate said actuating means.

16. A securing device as defined in claim 15 wherein said actuating means includes a lever arm engaging with the end of said bushing opposite said slots and means in said lever arm for engagement by a tool suitable to pivot said lever arm to shift said bushing.

17. A securing device as defined in claim 16 wherein said bushing is provided with a deep transverse slot in the end thereof opposite said tubular wall portion and a pin traversing said transverse slot,
said lever arm including a circularly shaped swivel head at one end thereof pivotally supported within the aperture in said lateral extension and a slot in the other end thereof engaging with said pin in said bushing.

18. A securing device as defined in claim 16 wherein said bushing and said housing are curved in the shape of a circular sector with the center thereof passing through the end of said lever arm in said lateral extension,
said lever arm being rigidly secured to said bushing.

19. A securing device as defined in claim 15 wherein said crown pieces are each provided with a cam member protruding from the inner faces thereof and spaced above said arcuate groove by a distance only slightly greater than the thickness of said tubular sleeve,
said tubular member being provided with a recess at each marginal edge corresponding in size to said cam members and positioned to permit passage of said tubular member past said cam members and into contact with said arcuate groove.

20. A corner or butt joint for removably securing flat structural parts to each other while permitting the same to be easily assembled and disassembled, comprising: a plurality of structural parts; at least one shaft having a head on one axial end, said shaft having means for mounting in at least one of said structural parts with said head projecting a predetermined uniform distance from one surface of said at least one structural part; a lock member mounted for oscillation in another of said structural parts transverse to said shaft in the assembled position of said structural parts, said lock member having a slot smaller in width than the maximum diameter of the head of said shaft and receiving said shaft beneath said head in the assembled position, the opposing surfaces of said lock member adjacent said slot being tapered to form wedge shaped surface means for said slot providing increased pressure on the head of said shaft engaged thereby to draw said at least one structural part toward said another structural part upon oscillation of said lock member transverse to said shaft; said lock member being substantially tubular and having a plurality of additional slots substantially identical to said first-mentioned slot and axially aligned with respect to each other; a corresponding plurality of structural parts having mounted therein headed shafts substantially identical to said first-mentioned shaft for engaging in corresponding ones of said slots; said slots opening in one axial diretcion for axially receiving therein said shafts so that said lock member has a plurality of axially extending finger portions between said slots; a substantially tubular guide sleeve surrounding and telescopically engaging said lock member and having a plurality of apertures having a cross sectional dimension at least as great as the corresponding cross sectional dimension of the shaft heads and being aligned with corresponding ones of said slots to constitute means for radially reinforcing said lock member.

21. A corner or butt joint for removably securing flat structural parts to each other while permitting the same to be easily assembled and disassembled, comprising: a plurality of structural parts; at least one shaft having a head on one axial end, said shaft having means for mounting in at least one of said structural parts with said head projecting a predetermined uniform distance from one surface of said at least one structural part; a lock member mounted for oscillation in another of said structural parts transverse to said shaft in the assembled position of said structural parts, said lock member having a slot smaller in width than the maximum diameter of the head of said shaft and receiving said shaft beneath said head in the assembled position, the opposing surfaces of said lock member adjacent said slot being tapered to form wedge shaped surface means for said slot providing increased pressure on the head of said shaft engaged thereby to draw said at least one structural part toward said another structural part upon oscillation of said lock member transverse to said shaft; said another structural part having a relatively fixed bearing plate with an aperture at least as large as the head on said shaft and being aligned with said slot; said shaft having a collar portion substantially the same configuration as said aperture in cross section and depth; said collar being spaced from said head portion a distance corresponding to the spacing of said aperture from the furtherest effective wedging surface of said lock member adjacent said slot engaging said head so that in the assembled position of said structural parts said collar will be completely received tightly in said aperture to constitute means for centering said structural parts transverse to said shaft.

References Cited

UNITED STATES PATENTS

| | | | |
|---|---|---|---|
| 735,618 | 8/1903 | Tannewitz | 287—20.927 |
| 1,098,917 | 6/1914 | Norcross et al. | 287—20.927 |
| 2,581,816 | 1/1952 | Schlueter | 287—20.924 |
| 2,784,019 | 3/1957 | Des Combes | 287—20.924 |
| 3,229,334 | 1/1966 | Thome | 287—20.92 |

CARL W. TOMLIN, *Primary Examiner.*

R. S. BRITTS, *Assistant Examiner.*